United States Patent [19]

Guy

[11] Patent Number: 4,808,450

[45] Date of Patent: Feb. 28, 1989

[54] SIDE BODY MOLDING FOR ATTACHMENT TO A VEHICLE BODY

[75] Inventor: Robert R. Guy, North Royalton, Ohio

[73] Assignee: Sterling Engineered Products Inc., Maumee, Ohio

[21] Appl. No.: 884,101

[22] Filed: Jul. 10, 1986

Related U.S. Application Data

[62] Division of Ser. No. 531,415, Sep. 12, 1983, Pat. No. 4,600,461.

[51] Int. Cl.⁴ .............................................. B60R 13/04
[52] U.S. Cl. .................................... 428/31; 293/128; 428/318.6; 428/319.7
[58] Field of Search .................. 428/31, 40, 158, 159, 428/160, 319.7; 293/128

[56] References Cited

U.S. PATENT DOCUMENTS

| | | | |
|---|---|---|---|
| 2,132,152 | 10/1938 | Fischer | 156/244.27 X |
| 3,159,698 | 12/1964 | Suh et al. | 156/244.27 X |
| 3,220,902 | 11/1965 | Edwards | 264/46.1 X |
| 3,231,457 | 1/1966 | Meissner | 428/86 |
| 3,331,900 | 7/1967 | Thomas | 264/46.1 |
| 3,400,040 | 9/1968 | Osgood | 428/31 X |
| 3,528,873 | 9/1970 | Scholl et al. | 428/319.7 X |
| 3,668,288 | 6/1972 | Takahashi | 264/46.8 X |
| 3,669,794 | 6/1972 | Mazur | 156/244.27 |
| 3,733,381 | 5/1973 | Willette et al. | 428/187 X |
| 3,764,642 | 10/1973 | Boutillier | 264/54 X |
| 3,777,438 | 12/1973 | Brown | 428/31 X |
| 3,813,199 | 5/1974 | Friesner | 428/31 X |
| 3,879,505 | 4/1975 | Boutillier | 264/48 |
| 3,957,940 | 5/1976 | Schubert et al. | 428/218 X |
| 4,220,681 | 9/1980 | Narita | 428/31 |
| 4,515,649 | 5/1985 | Nussbaum | 428/31 X |
| 4,600,461 | 7/1986 | Guy | 428/31 X |

*Primary Examiner*—Henry F. Epstein
*Attorney, Agent, or Firm*—Marshall & Melhorn

[57] ABSTRACT

The present invention concerns an apparatus and process for producing an improved extruded plastic material product which consists of an inner foamed thermoplastic cellular core and an outer non-porous thermoplastic skin extending along at least one side of the core. In the process, a foamable thermoplastic material is extruded through a first die outlet to produce a foamed thermoplastic material. After exiting the die outlet, a film of non-porous thermoplastic material is applied along at least one side of extruded foamed material. Next, the extruded foamed material and the non-porous film is fed through a forming die which shapes and seals the materials into the desired cross-sectional shape.

8 Claims, 1 Drawing Sheet

U.S. Patent  Feb. 28, 1989  4,808,450
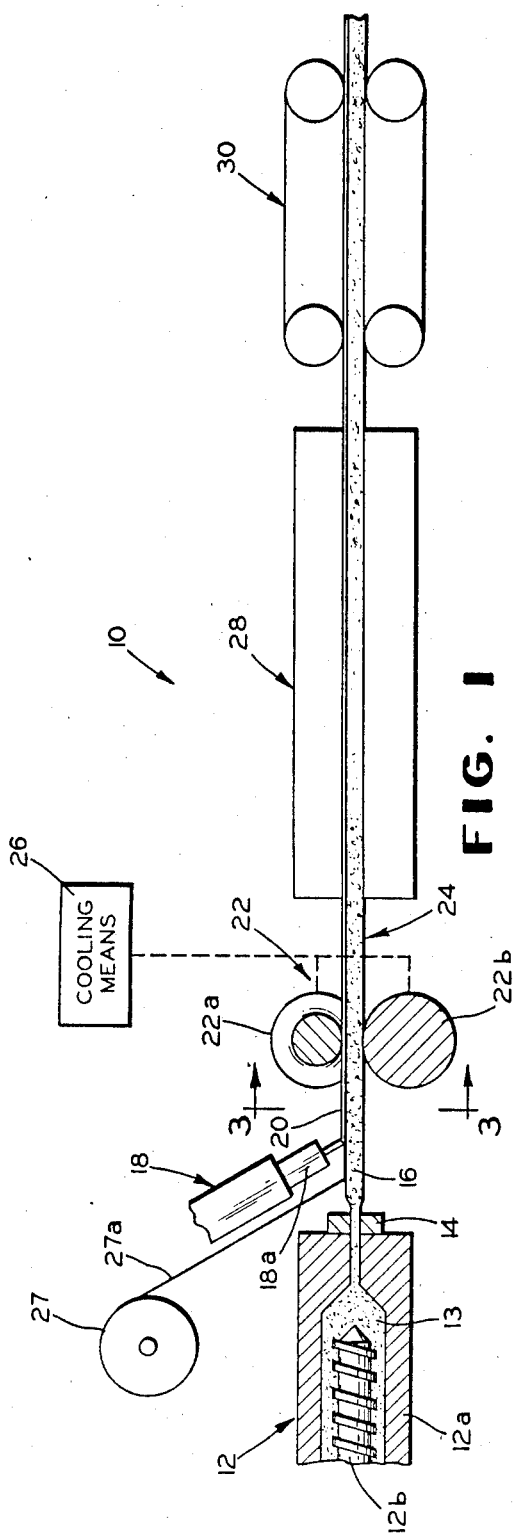
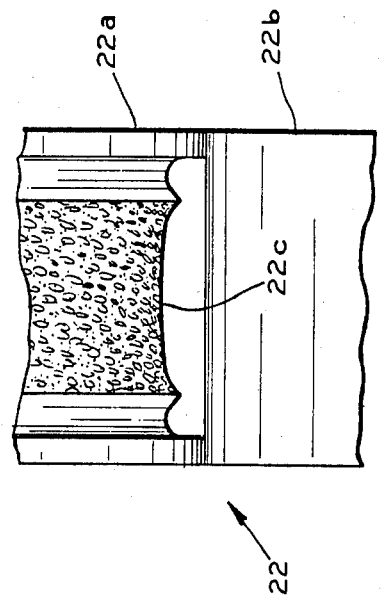
FIG. 1
FIG. 2
FIG. 3

SIDE BODY MOLDING FOR ATTACHMENT TO A VEHICLE BODY

RELATED APPLICATION

This application is a division of application Ser. No. 531,415, filed Sept. 12, 1983 now U.S. Pat. No. 4,600,461.

BACKGROUND OF THE INVENTION

The present invention relates generally to an apparatus and process for producing an extruded plastic material product and, in particular, to an extrusion process for producing a thermoplastic material product having a foamed cellular core and an integral, non-porous skin.

Production of foamed thermoplastic material products by a continuous extrusion process has become increasingly popular. It has been found that the continuous extrusion process offers significant advantages of economy and versatility over the more common foam injection molding process. While commercial activities have concentrated on the lower cost thermoplastic materials such as polystyrene, polyethylene, and polyvinylchloride, there has been considerable development activity in polypropylene, acrylonitrile butadiene-styrene, polyamides and polycarbonates.

One of the most common methods of producing extruded foamed thermoplastic material is known as the freefoaming extrusion technique. This process is similar to conventional solid plastic extrusion except that the thermoplastic melt material contains a blowing agent which causes the melt material to foam and expand as the melt material emerges from an extruder die. In this process, the extruder die is constructed to produce a foamed thermoplastic material having a cross-sectional profile which is an approximation of the desired cross-sectional profile. The foamed thermoplastic material is then fed through a sizer which shapes the foamed thermoplastic material into a product having the desired cross-sectional profile. While this technique is typically capable of producing a foamed thermoplastic product having a uniform distribution of cells of the desired size, the resulting skin tends to be rather porous.

In order to obtain an extruded foamed thermoplastic material product with an outer solid or non-porous skin which surrounds an inner cellular core, a technique known as the controlled foam extrusion process is used. Examples of such a process can be found in U.S. Pat. No. 3,764,642 to Boutillier. The controlled foam extrusion process consists of extruding a foamable thermoplastic melt material uniformly containing a blowing agent through a specially designed extruder die and into a cooled shaper which is adjacent the die. The shaper is provided with a longitudinally extending cooled internal metal surface adapted to form the desired cross-sectional shape in the extruded melt material. In the shaper, the outer surface of the extruded melt material is rapidly cooled as it comes in contact with the metal surface to prevent foaming of the melt material adjacent the outer surface, thereby forming an outer integral solid skin. At the same time, the inner portion of the extruded melt material expands to form an inner cellular core.

In some instances, the extruder die can be designed to produce extruded foam products having a solid skin along one portion of the outer surface of the product and a cellular portion along the remaining portion of the outer surface. Such an arrangement is disclosed in U.S. Pat. No. 3,879,505 to Boutillier et al.

In the controlled foam extrusion process described above, the outer integral skin is formed about the inner cellular core by rapidly cooling a portion of the extruded melt material prior to the reaction of the blowing agent. Immediately after leaving the extruder die, an outer portion of the melt material contacts the cooled inner metal surface of the shaper and is pressed against this cooled surface by the expansion of the remaining inner portion of the melt. The cooled inner surface of the shaper is maintained at a temperature which enables the melt material in contact therewith to be cooled to a temperature below the blowing temperature of the melt material, thereby preventing expansion of this portion of the melt material to produce an outer, integral skin.

The thickness of the skin produced by this process corresponds to the depth in the melt material which is cooled to a temperature lower than the blowing temperature prior to the reaction of the blowing agent. Thus, in order to produce a relatively thick skin, it is necessary to maintain the temperature of the inner forming surface of the shaper substantially below the associated blowing temperature. It will also be appreciated that the inhibited blowing agent in this process remains in the skin portion ready to react if the skin is subsequently exposed to heat.

SUMMARY OF THE INVENTION

The present invention concerns an apparatus and process for producing an extruded thermoplastic material product having a foamed cellular core and a non-porous, integral skin. In the process of the present invention, a foamable thermoplastic material having a blowing agent therein is extruded through a first or core die outlet. Upon exiting the first die outlet, the blowing agent reacts to form a foamed thermoplastic material. After the formation of the foamed thermoplastic material, a skin or film of non-porous thermoplastic material which is free of all blowing agents is applied along at least one side of the extruded foamed thermoplastic material. In some instances, one or more decorative films are applied to the extruded foamed thermoplastic material prior to the application of the film or skin of non-porous thermoplastic material. Typically, the non-porous thermoplastic material is extruded through a second die outlet positioned adjacent the first die outlet. After the outer non-porous film is applied, the extruded foamed material having the non-porous film thereon is fed through a forming die having a profile similar to the core die which shapes and seals together the foamed core material and the outer non-porous film into the desired cross-sectional shape. If desired, the forming die can be adapted to impress a predetermined texture or gain along a selected portion of the outer non-porous film.

From the forming die, the shaped plastic material enters a cooling station such as a water tank, for example. The plastic material can be pulled through the extrusion process by conventional means such as a pair of endless belts, for example.

The process according to the present invention offers several advantages over the prior art processes. For example, the extrusion process enables conventional extrusion equipment to be used to make the product. Also, the process of the present invention enables the skin thickness and location on the product substantially to be selected at random and to be more easily controlled. Furthermore, as will be discussed in more detail hereinafter, the present invention permits the use of dissimilar but compatible materials in the skin and core and several types of pigmenting and decorating options.

It has been found that the novel product manufactured according to the process of the present invention can advantageously be used, for example, as a molding and is particularly adapted for use as a protective side molding which is attached to a vehicle body.

BRIEF DESCRIPTION OF THE DRAWINGS

The above, as well as other advantages of the present invention, will become readily apparent to one skilled in the art from reading the following detailed description in conjunction with the accompanying drawings in which:

FIG. 1 is a schematic diagram representing the extrusion process of the present invention;

FIG. 2 is a typical cross-sectional view through the novel extruded product produced by the process shown in FIG. 1; and FIG. 3 is an elevational view taken along the line 3—3 of FIG. 1 (without, however, depicting the extruded product) illustrating the front of the forming rolls.

DESCRIPTION OF THE PREFERRED EMBODIMENT

Referring to FIG. 1, there is shown a schematic diagram which illustrates an extrusion system 10 of the present invention. The system 10 includes a conventional first extrusion machine 12 having an outer housing 12a and an inner rotatable extrusion screw 12b. A foamable thermoplastic material 13 having a blowing agent blended therein is contained within the housing 12a. A profile die 14 is mounted adjacent the outlet of the extruder 12 for shaping the foamable thermoplastic material 13 which is driven through the die 14 by the screw 12b. As the foamable thermoplastic material 13 exits the die 14, the blowing agent therein reacts to expand the material into a foamed thermoplastic material 16.

A second extrusion machine 18 having an outlet die 18a positioned adjacent the profile die 14 is adapted to apply a non-pigmented or pigmented film of non-porous thermoplastic material 20 along a portion of the surface of the foamed material 16 produced by the extruder 12. A forming die 22 consisting of power driven forming rollers 22a and 22b is located following the extruders 12 and 18 and is adapted to shape and integrally seal the extruded materials 16 and 20 into a unitary product 24 having the desired cross-sectional shape. The forming die 22 is provided with cooling means 26 for cooling the product 24 during the forming operation. A typical cross section of the extruded product 24 after it has been shaped by the forming die 22 is shown in FIG. 2, while a front view of the forming rollers utilized to produce the desired shape is shown in FIG. 3. As shown in FIG. 2, the product 24 includes an inner cellular core 24a formed from the foamed material 16 and an integral non-porous skin 24b formed from the non-porous material 20.

It will be appreciated that several pigmenting options are possible with the present invention. For example, the film of non-porous, i.e., unfoamed, thermoplastic material 20 can be clear or translucent, while the underlying foamed material 16 can be pigmented to produce the selected color. Alternatively, the non-porous thermoplastic material 20 can be opaque and pigmented to the desired color, such that the underlying foamed material 16 can be unpigmented or any random color.

In instances wherein the outer film of non-porous thermoplastic material 20 is clear or translucent, it may be desirable to apply a decorative film over the foamed material 16 prior to the application of the non-porous thermoplastic material 20. For example, in FIG. 1, a roller assembly 27 provides a supply of a decorative film 27a which can be applied along selected portions of the foamed material 16 by suitable guide means (not shown in the drawings) prior to the application of the non-porous material 20. The decorative film 27a can be a colored or vacuum metalized Mylar strip, for example. The decorative film 27a is shown in FIG. 2 as two individual portions 24c.

Additionally, a grain or texture can be formed in selected portions of the outer non-porous film 20 by means of the forming rolls 22. For example, in FIG. 3, the central portion 22c of the upper roller 22a is provided with a textured surface corresponding to the desired texture to be formed along a central portion 24d (shown in FIG. 2) of the non-porous skin 24b.

After the extruded product 24 has been molded into the desired size and shape by the forming die 22, the extruded product 24 enters a cooling system such as a water tank 28. The extruded product 24 can be pulled through the system by conventional means such as a pair of endless belts 30 driven in synchronism with the forming rollers.

It will be appreciated that many types of thermoplastics and blowing agents can be used with the present invention. Examples of thermoplastics include homopolymeric polystyrene resinous mixtures, copolymers of styrene, acrylic polymers, homopolymers of vinyl chloride, polyolefins, polyamides, straight chain polyurethanes, straight chain polyesters, polycarbonates, polyethers, vinyl ethers, and vinyl esters. Examples of blowing agents include chemical blowing agents such as organic or inorganic bicarbonates or oxalates, azochemicals, hydrazides, and amine nitrates. Also, low boiling liquids which can produce gas by vaporization under low pressure conditions can be used. Examples of these blowing agents include carbon dioxide and aliphatic hydrocarbons.

Typically, the temperature in the first and second extruders 12 and 18 is maintained within a range of from 50° C. to 260° C., depending on the particular type of thermoplastic material and blowing agent utilized. The amount of blowing agent which is added to the core thermoplastic material is dependent on the desired reduction in specific gravity of the thermoplastic material and is thus a function of the specific gravity of the finished product. It has been found that, when the blowing agent and the thermoplastic material are first blended together and then pelletized to produce a homogeneous mixture, better control of the foaming operation is achieved.

An example of a product which can be produced by way of the above described process and apparatus is an automobile body side molding and utilizes a foamable thermoplastic core material consisting of a polyvinylchloride base compound and an azodicarbonamide blowing agent. The desired specific gravity of the finished product can be achieved by a reduction of thirty percent in specific gravity of the polyvinylchloride base compound by utilizing six-tenths of one percent by weight of blowing agent in the polyvinylchloride base compound. The molding is thereafter satisfactorily achieved by applying a substantially non-porous thermoplastic film composed of the same polyvinylchloride base compound as used in the core but free of any blowing agent to a major surface of the core, i.e., the surface not to be adhered to and in contact with the automobile body.

The die outlet 18a of the second extruder 18 is positioned to apply the film of non-porous thermoplastic material 20 at a thickness corresponding to the desired thickness of the skin 24b. Preferably, the thickness of the skin 24b is in the range of from 0.3 to 1.0 mm. Typically, the distance between the extrusion dies 14 and 18a, and the forming die 22 is such as to maintain the desired temperatures associated with the process within acceptable limits.

In this example, the temperatures of both of the extruders 12 and 18 are controlled such that the temperature at which the materials 13 and 20 are extruded from their respective dies is approximately 182° C. In this situation, it has been found that the distance between the extruder die 14 and the forming die 22 should not exceed a distance which permits the temperature of the materials 13 and 20 entering the forming die 22 to drop below approximately 132° C. Under normal operating conditions, the distance between the extruder die 14 and the forming die 22 should not exceed nine inches. The line speed at which the belts 30 pull the product 24 can vary depending on the parameters of the system. In this example, the cooling means 26 maintains the temperature of both the top an bottom forming rolls 22a and 22b of the forming die 22 between 26° C. and 54° C.

In accordance with the provisions of the patent statutes, the principle and mode of operation of the present invention have been illustrated and described in what is considered to represent its best embodiment. However, it should be understood that the invention may be practiced otherwise than as specifically illustrated and described without departing from its spirit or scope.

I claim:

1. A molding of predetermined cross sectional design comprising: a core of foamed thermoplastic material having an open or porous surface area and an opposite surface for attachment to a structure; and an outer film or skin of substantially non-porous thermoplastic material superimposed on and integrally sealed to the porous surface area of said core, said outer film and core being shaped and integrally sealed together after superimposition to provide said predetermined cross sectional design.

2. The molding defined in claim 1, wherein both said thermoplastic materials are polyvinylchloride.

3. The molding defined in claim 1, wherein said core and outer skin are composed of different but compatible thermoplastic materials.

4. A side body molding of predetermined cross sectional design for attachment to a vehicle body comprising: a core of foamed thermoplastic material having a first surface area and an opposite surface for attachment to the vehicle body; and an outer skin of substantially non-porous thermoplastic material superimposed on and integrally sealed to said first surface of the core and including an exposed surface having a glossy finish, said skin and core being simultaneously shaped and integrally sealed together after superimposition to provide said predetermined cross sectional design.

5. The molding defined in claim 4, wherein said outer skin is substantially transparent, and including a decorative film interposed at selected locations between said core and said outer skin.

6. The molding defined in claim 4, including a decorative pigment dispersed within said outer skin.

7. The molding defined in claim 4, wherein the density of said core is approximately 70 percent of the density of said outer skin.

8. The molding defined in claim 4, wherein said outer skin has a thickness in the range of from 0.3 to 1 mm

* * * * *